United States Patent
Sennett et al.

(10) Patent No.: US 8,682,365 B2
(45) Date of Patent: *Mar. 25, 2014

(54) COMMUNICATIONS DEVICE MEDIA DELIVERY

(75) Inventors: DeWayne Allan Sennett, Redmond, WA (US); Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,033

(22) Filed: Mar. 6, 2012

(65) Prior Publication Data
US 2012/0165052 A1 Jun. 28, 2012

Related U.S. Application Data

(63) Continuation of application No. 12/572,577, filed on Oct. 2, 2009, now Pat. No. 8,150,430.

(51) Int. Cl.
*H04W 4/12* (2009.01)
(52) U.S. Cl.
USPC .......................................... 455/466; 707/758
(58) Field of Classification Search
USPC ............ 455/422.1, 412.1, 466; 707/758, 781, 707/784
See application file for complete search history.

(56) References Cited

U.S. PATENT DOCUMENTS

| | | | |
|---|---|---|---|
| 7,707,218 B2 | 4/2010 | Gocht et al. | |
| 8,150,430 B2 | 4/2012 | Sennett et al. | |
| 2005/0089006 A1* | 4/2005 | Wang et al. | 370/349 |
| 2006/0271551 A1 | 11/2006 | Suojasto | |

* cited by examiner

*Primary Examiner* — Phuoc H Doan
(74) *Attorney, Agent, or Firm* — Baker & Hostetler LLP

(57) ABSTRACT

A communications device determines the appropriate method for providing a message depending upon the content of the message without prompting or querying a user of the device. When the user selects a name as the recipient of the created message, the mobile device determines delivery options. If the message contains text only and if the user enters/selects a mobile device phone number, the message is sent via SMS. If the message contains multimedia and if the user enters or selects a mobile device phone number, the message is sent via MMS. If the message is text only or multimedia, and if the user enters or selects an email address, the message is sent via email. In various implementations, the message is delivery via determined delivery options including a lowest cost delivery option, a subscriber preferred delivery option, or a delivery options as indicated by an intended recipient's presence information.

17 Claims, 6 Drawing Sheets

COMMUNICATIONS DEVICE MEDIA DELIVERY

CROSS REFERENCE TO RELATED APPLICATIONS

The instant application is a continuation application of U.S. patent application Ser. No. 12/572,577, entitled "Communications Device Media Delivery," filed Oct. 2, 2009, which is hereby incorporated by reference in its entirety.

BACKGROUND

Current implementations and standards for the support of multimedia on mobile devices is complex. For example, a typical mobile device prompts a user with a query asking if the user wants to send a message via SMS, MMS, or email. This requires the user to have knowledge of and understand the various types of multimedia delivery methods (e.g., SMS, MMS, email), the differences between the various types of multimedia delivery methods, and how to use the various types of multimedia delivery methods.

SUMMARY

A communications device determines the appropriate method for providing a message depending upon the content of the message. The communications device determines the content type, automatically, without providing a prompt to, or querying a user of the communications device, unless the content type is undeterminable. For example, if the message contains text only and if the user enters a phone number or selects a phone number from an address book, the message is sent via SMS. If the message contains multimedia (e.g., video, a picture) and if the user enters a phone number or selects a phone number from the address book, the message is sent via MMS. If the message is text only or multimedia (with or without text), and if the user enters an email address (e.g., name@domain.xxx) or selects an email address from the address book, the message is sent via email.

In an example embodiment, if there are multiple delivery options, the lowest cost option is selected. For example, a text message could be sent via SMS to the recipient cell phone number of 555-580-1234 or could be sent as an email message to 5555801234@txt.attnet. Both addresses will deliver the text message to the same mobile device of the intended recipient. However, it is possible that one method could be more expensive. In an example embodiment, if there are multiple delivery options and the subscriber has indicated a preference for message delivery (either for this subscriber or for all messages), the message is delivered via the subscriber preferred delivery method, thus possibly overriding the lowest cost option.

Thus, in an example scenario, when a subscriber selects an intended recipient of a message, the mobile device finds the intended recipient in the internal address book of the device (or at any appropriate location). Based upon the media type of the message (e.g., text only, text and multimedia attachment, etc.), based upon cost factors (e.g., unlimited SMS messaging plan, international roaming charges), based upon network presence information for the intended recipient, and based upon subscriber preferences in the address book, the mobile device automatically selects the appropriate delivery method.

In another example embodiment, if the intended recipient's contact information in the subscriber's address book contains multiple email addresses (e.g., email address of PC, email address of mobile device), and the subscriber has not indicated which address is preferred and if there is a presence service available, the message is delivered in accordance with the presence information as follows. If presence is indicated only on the mobile device, the message is delivered to the mobile device email address. If presence is indicated only on the PC, the message is delivered to the PC email address. If presence is indicated on both the mobile device and the PC, the message can be delivered to either the mobile device email address or the PC email address, or the message can be sent to a default email address.

DETAILED DESCRIPTION OF ILLUSTRATIVE EMBODIMENTS

Figure 1:
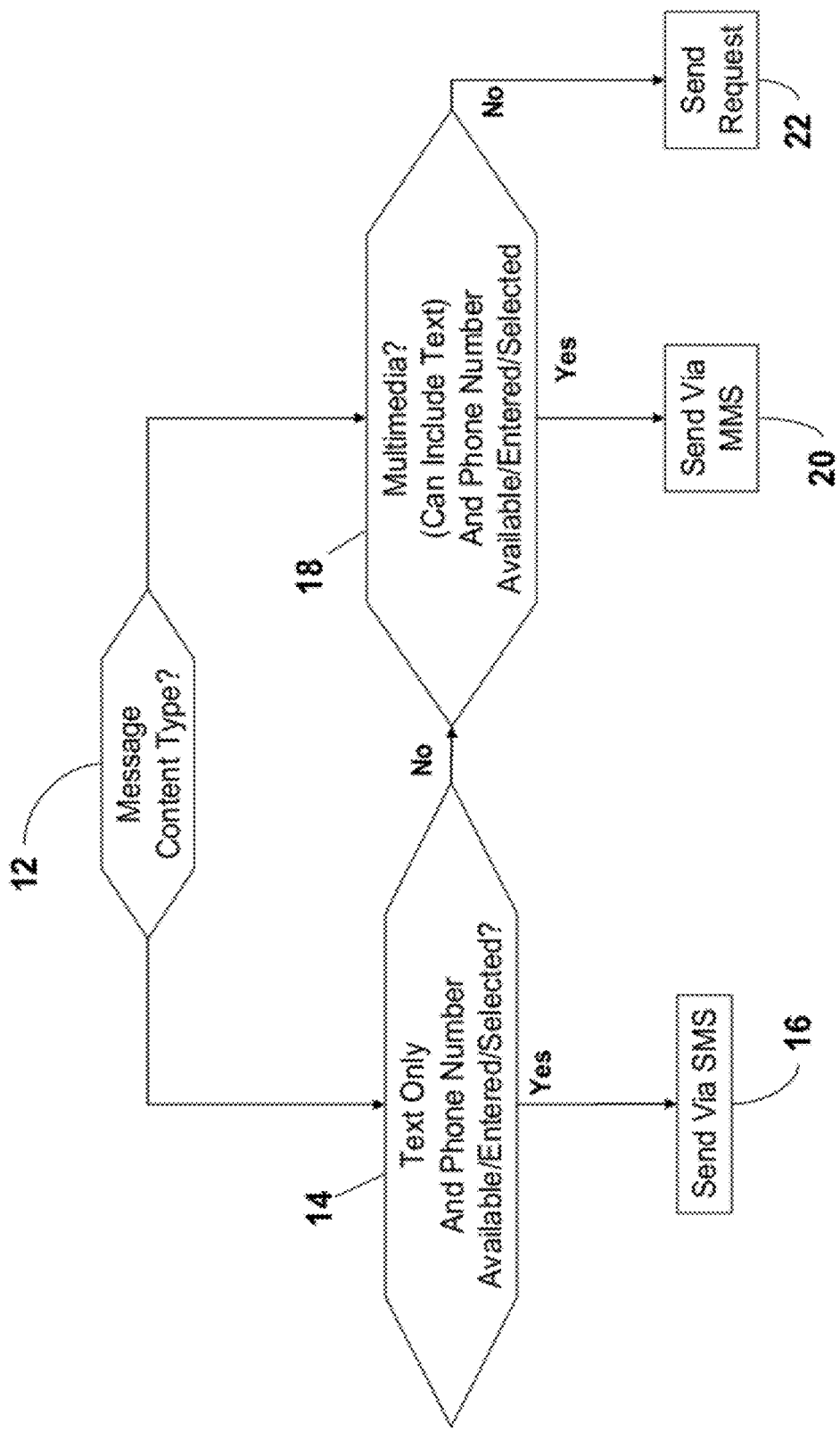
FIG. 1 is a flow diagram depicting an example process for providing media via a mobile communications device.

FIG. 1 is a flow diagram depicting an example process for providing media via a mobile communications device. The content type of a message to be sent via a mobile communications device is determined at step 12. If the content type is text only (step 14) and a phone number is available or has been entered or selected, the message is sent via the Short Message Service (SMS) at step 16. If the content type is multimedia (step 18), which can include text, and a phone number is available or has been entered or selected, the message is sent via the Multimedia Message Service (MMS) at step 20. Multimedia, as depicted herein includes any content type other than text only. Thus multimedia can include an image, audio, video, or any combination thereof, or text in any combination with an image, audio, video. Text can include plain text and rich text. If, at step 18, it is determined that the message content does not include multimedia, the mobile communications device provides a request, at step 22, for the content type to be utilized. The request, in an example embodiment, comprises a query on a display of the mobile communications device asking for a delivery method content type. In various embodiments, the user can select from a menu of content types or enter a content type.

Figure 2:
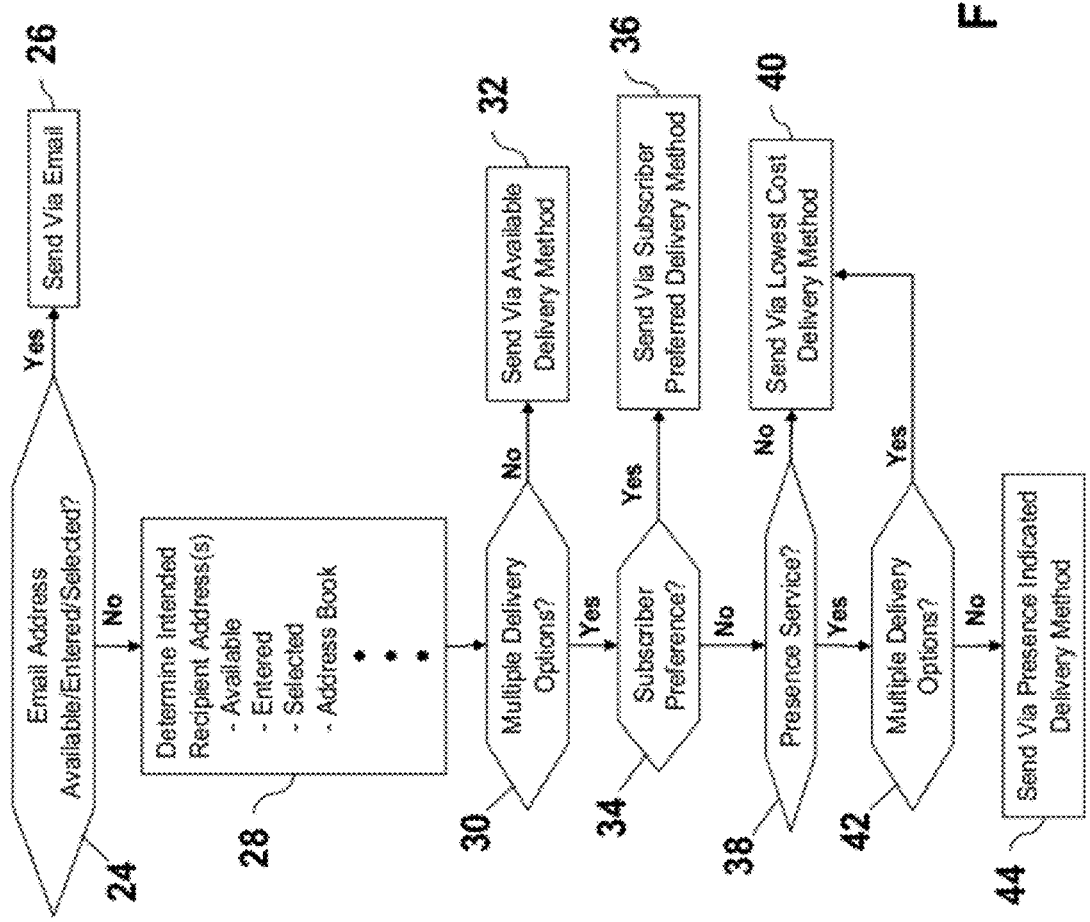
FIG. 2 is another flow diagram depicting an example process for providing media via a mobile communications device.

FIG. 2 is another flow diagram depicting an example process for providing media via a mobile communications device. At step 24, it is determined if an email address of the intended recipient is available or has been entered or selected via the mobile communications device. If an email address is available or has been entered or selected, the message is provide via email at step 26. If an email address is not available or has not been entered or selected, the address, or addresses, of the intended recipient is determined at step 28. The address can include any appropriate address, such as a phone number, URL or the like. The address can be obtained by the user entering an address or selecting an address. The address can be obtained from an address book by the user, automatically by the mobile communications device, or a combination thereof.

At step 30 it is determined if multiple delivery options for providing the message to the intended recipient are available. For example, a text message could be sent via SMS to the recipient cell phone number (e.g., 555-580-1234) or could be sent as an SMS message via a gateway to an email message to an email address (e.g., 5555801234@txt.att.net). Both addresses will deliver the text message as an SMS message to the same mobile device of the intended recipient. If multiple delivery options are not available (step 30), the message is provided via the available delivery method at step 32.

If multiple delivery options are available (step 30), it is determined, at step 34, if the subscriber associated with the mobile communications device has a preferred delivery method. For example, the subscriber could enter a default preferred method to send the message to a phone number. If, at step 34, it is determined that the subscriber has a preference, the message is provided, at step 36, via the preferred delivery method.

If, at step 34, it is determined that the subscriber does not have a preference, it is determined, at step 38, if a presence service is available. As known, a presence service provides an indication of the ability and/or willingness of the intended recipient to communicate. If it is determined, at step 38, that no presence service is available, the message is sent via that lowest cost delivery method at step 40. The lowest cost delivery method can be determined in any appropriate manner. For example, the user/subscriber can enter the lowest cost delivery method or the mobile communications device can determine the lowest cost delivery method in accordance with the subscribers profile, current rates, etc.

If it is determined, at step 38, that presence service is available, it is determined, at step 42, if multiple delivery options are available. For example, the intended recipient may have a mobile communications device and a PC via which the intended recipient can receive messages. Thus, the presence service could indicate presence (the intended recipient is willing/able to communicate) for the intended recipient's mobile device, PC, or both (e.g., multiple delivery options). If it is determined, at step 42, that multiple delivery options are not available, the message is delivered in accordance with the presence indicated delivery method. That is, for example, if presence indicates the intended recipient's mobile device, the message is sent to the intended recipient's mobile device, or if presence indicates the intended recipient's PC, the message is sent to the intended recipient's PC.

If it is determined, at step 42, that multiple delivery options are available (e.g., presence indicated on both the intended recipient's mobile device and the intended recipient's PC), the message is delivered via that lowest cost delivery method at step 40.

Figure 3:
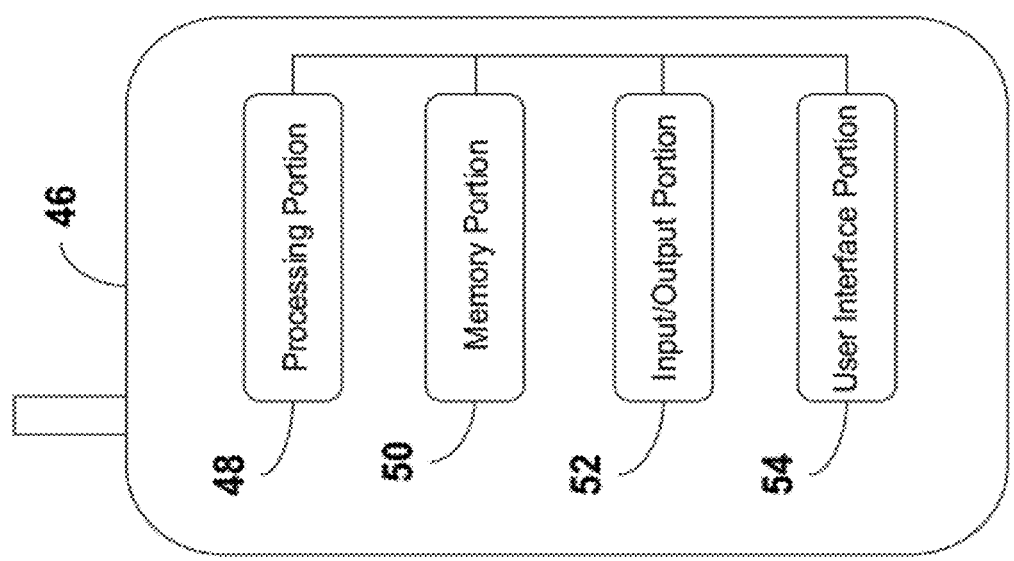
FIG. 3 is a block diagram of an example mobile wireless communications device configured to provide media.

FIG. 3 is a block diagram of an example mobile communications device 46 configured to provide media. In an example configuration, the mobile communications device 46 is a wireless device. The mobile communications device 46 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The mobile communications device 46 can include devices that are not typically thought of as portable, such as, for example, a public computing device, a navigation device installed in-vehicle, a set top box, or the like. The mobile communications device 46 can include non-conventional computing devices, such as, for example, a kitchen appliance, a motor vehicle control (e.g., steering wheel), etc., or the like.

The mobile communications device 46 can include any appropriate device, mechanism, software, and/or hardware for providing media as described herein. In an example configuration, the mobile communications device 46 comprises a processing portion 48, a memory portion 50, an input/output portion 52, and a user interface (UI) portion 54. It is emphasized that the block diagram depiction of mobile communications device 46 is exemplary and not intended to imply a specific implementation and/or configuration. For example, in an example configuration, the mobile communications device 46 comprises a cellular phone and the processing portion 48 and/or the memory portion 50 are implemented, in part or in total, on a subscriber identity module (SIM) of the mobile communications device 46. In another example configuration, the mobile communications device 46 comprises a laptop computer. The laptop computer can include a SIM, and various portions of the processing portion 48 and/or the memory portion 50 can be implemented on the SIM, on the laptop other than the SIM, or any combination thereof.

The processing portion 48, memory portion 50, and input/output portion 52 are coupled together to allow communications therebetween. In various embodiments, the input/output portion 52 comprises a receiver of the mobile communications device 46, a transmitter of the mobile communications device 46, or a combination thereof. The input/output portion 52 is capable of receiving and/or providing information pertaining to providing media as described above. For example, the input/output portion 52 is capable of receiving and/or sending SMS content, MMS content, audio content, multimedia content, plain text content, rich text content, email messages, or any combination thereof, as described herein. The input/output portion 52 also is capable of, for example, sending content to a destination phone number, via email, to a URL, or any combination thereof. In an example embodiment, the input/output portion 52 is capable of receiving information to determine a location of the mobile communications device 46. In an example configuration, the input\output portion 52 comprises a GPS receiver. In various configurations, the input/output portion 52 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 48 is capable of performing functions pertaining to providing media as described above. For example, the processing portion 48 is capable of determining message content, such as plain text, rich text, text only, multimedia, SMS, MMS, or the like, as described above. Also, for example, the processing portion 48 is capable of determining if an email address is available or has been entered or selected, determining an intended recipient's address, determining if multiple delivery options are available, determining a subscriber preference, determining if presence service is available, determining presence indications, or a combination thereof, as described herein.

In a basic configuration, the mobile communications device 46 can include at least one memory portion 50. The memory portion 50 can store any information utilized in conjunction with providing media as described above. For example, the memory portion 50 is capable of storing information pertaining to content type, an address book, an email address, a telephone number, intended recipient addresses, message delivery options, subscriber preferences, presence service, presence indications, or a combination thereof, as described above. Depending upon the exact configuration and type of processor, the memory portion 50 can be volatile (such as some types of RAM), non-volatile (such as ROM, flash memory, etc.), or a combination thereof. The mobile communications device 46 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 46.

The mobile communications device 46 also can contain a UI portion 54 allowing a user to communicate with the mobile communications device 46. The UI portion 54 can provide the ability to control the mobile communications device 46, via, for example, buttons, soft keys, voice actuated controls, a touch screen, movement of the mobile communications device 46, visual cues (e.g., moving a hand in front of a camera on the mobile communications device 46), or the like. The UI portion 54 can provide visual information (e.g., via a display), audio information (e.g., via speaker), mechanically (e.g., via a vibrating mechanism), or a combination thereof. In various configurations, the UI portion 54 can comprise a display, a touch screen, a keyboard, an accelerometer, a motion detector, a speaker, a microphone, a camera, a tilt sensor, or any combination thereof. The UI portion 54 can comprise means for inputting biometric information, such as, for example, fingerprint information, retinal information, voice information, and/or facial characteristic information.

Figure 4:
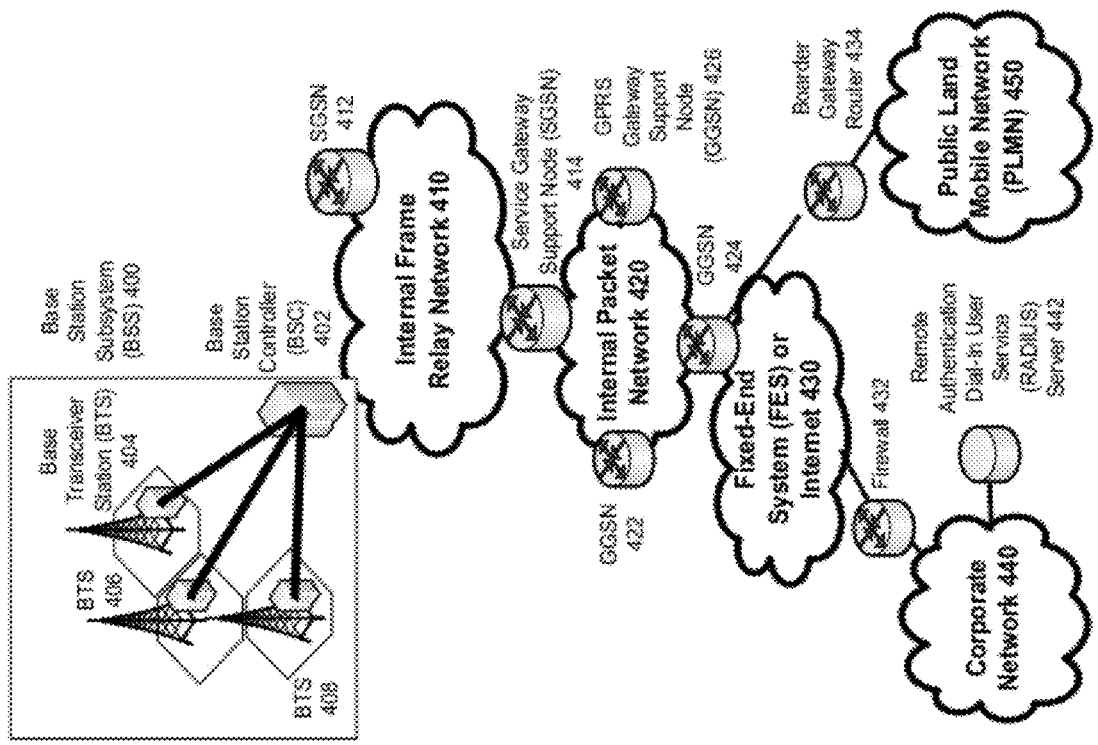
FIG. 4 depicts a block diagram of an exemplary packet-based mobile cellular network environment, such as a GPRS network, in which media can be provided via a communications device.

FIG. 4 depicts an overall block diagram of an exemplary packet-based mobile cellular network environment, such as a GPRS network, in which media can be provided via a communications device as described herein. In the exemplary packet-based mobile cellular network environment shown in FIG. 4, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 5:
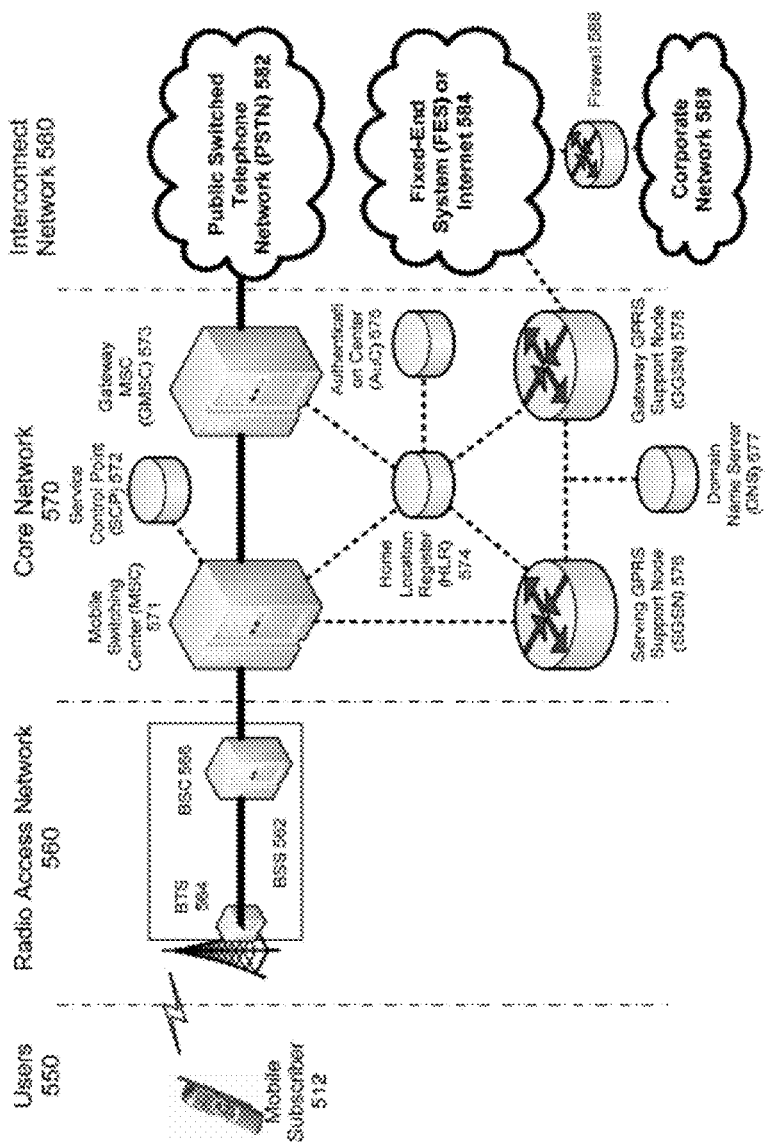
FIG. 5 illustrates an architecture of a typical GPRS network in which media can be provided via a communications device.

FIG. 5 illustrates an architecture of a typical GPRS network in which media can be provided via a communications device as described herein. The architecture depicted in FIG. 5 is segmented into four groups: users 550, radio access network 560, core network 570, and interconnect network 580. Users 550 comprise a plurality of end users. Note, device 512 is referred to as a mobile subscriber in the description of network shown in FIG. 5. In an example embodiment, the device depicted as mobile subscriber 512 comprises a mobile device (e.g., mobile wireless communications device 46). Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 5, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device (e.g., mobile wireless communications device 46), used by an end user of the mobile cellular service. When a mobile subscriber turns on his or her mobile device, the mobile device goes through an attach process by which the mobile device attaches to an SGSN of the GPRS network. In FIG. 5, when mobile subscriber 512 initiates the attach process by turning on the network capabilities of the mobile device, an attach request is sent by mobile subscriber 512 to SGSN 576. The SGSN 576 queries another SGSN, to which mobile subscriber 512 was attached before, for the identity of mobile subscriber 512. Upon receiving the identity of mobile subscriber 512 from the other SGSN, SGSN 576 requests more information from mobile subscriber 512. This information is used to authenticate mobile subscriber 512 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 512 was attached before, to cancel the location process for mobile subscriber 512. HLR 574 then notifies SGSN 576 that the location update has been performed. At this time, SGSN 576 sends an Attach Accept message to mobile subscriber 512, which in turn sends an Attach Complete message to SGSN 576.

After attaching itself with the network, mobile subscriber 512 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 512. The mobile subscriber 512 uses an algorithm to send the user identification (ID) and password to SGSN 576. The SGSN 576 uses the same algorithm and compares the result. If a match occurs, SGSN 576 authenticates mobile subscriber 512.

Next, the mobile subscriber 512 establishes a user session with the destination network, corporate network 589, by going through a Packet Data Protocol ("PDP") activation process. Briefly, in the process, mobile subscriber 512 requests access to the Access Point Name ("APN"), for example, UPS.com, and SGSN 576 receives the activation request from mobile subscriber 512. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 512.

Once activated, data packets of the call made by mobile subscriber 512 can then go through radio access network 560, core network 570, and interconnect network 580, in a particular fixed-end system or Internet 584 and firewall 588, to reach corporate network 589.

Figure 6:
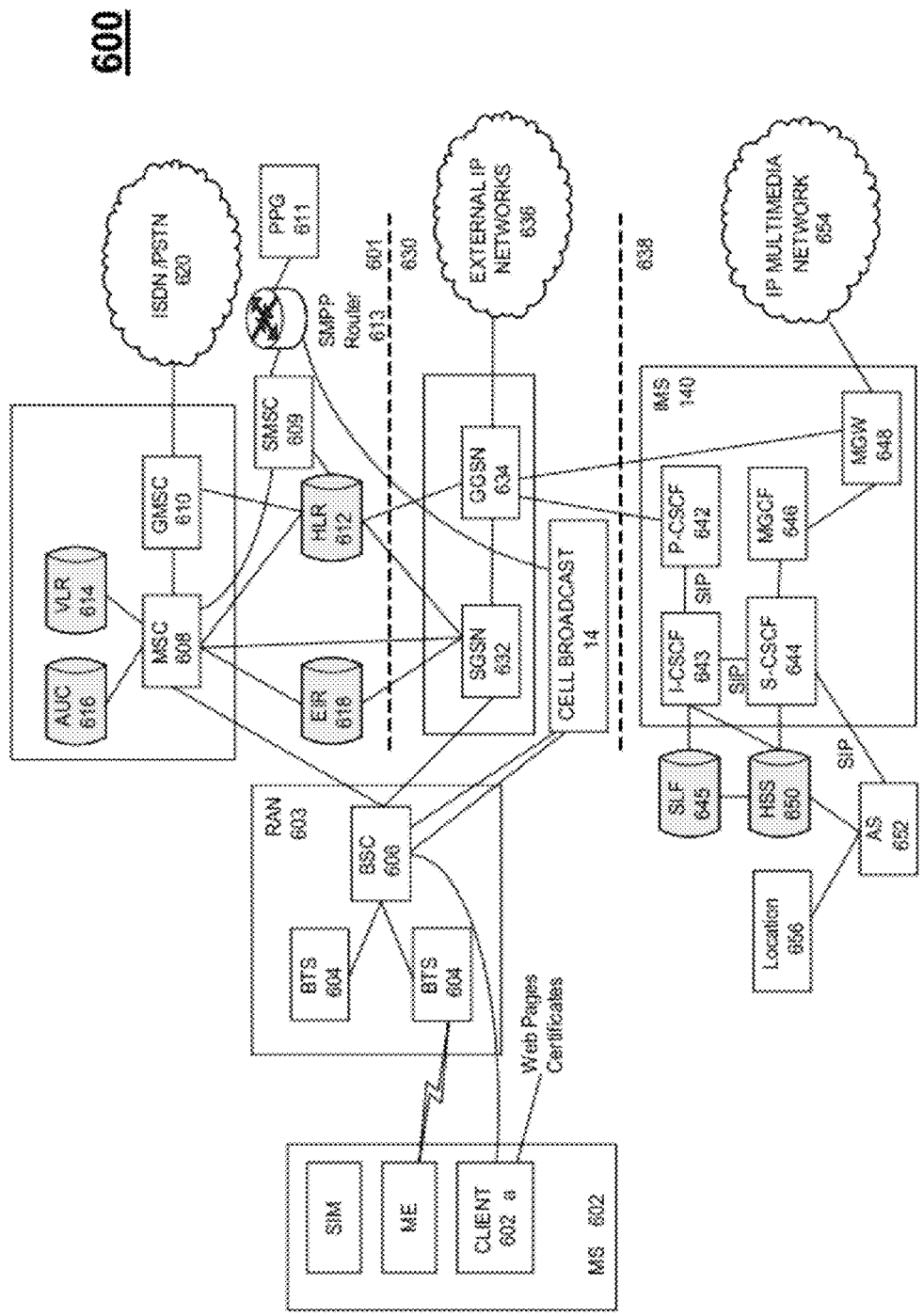
FIG. 6 illustrates an exemplary block diagram view of a GSM/GPRS/IP multimedia network architecture within which media can be provided via a communications device.

FIG. 6 illustrates an exemplary block diagram view of a GSM/GPRS/IP multimedia network architecture 600 within which media can be provided via a communications device as described herein. As illustrated, architecture 600 of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not have received pages from a circuit switched domain when engaged in a data call, since the MS is receiving data and is not listening to a paging channel In a NOM3 network, a MS can monitor pages for a circuit switched network while received data and vice versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of providing media via a communications device have been described in connection with various computing devices/processor, the underlying concepts can be applied to any computing device, processor, or system capable of providing and/or receiving usage information pertaining to usage of a mobile wireless communications device. The various techniques described herein can be implemented in connection with hardware or software or, where appropriate, with a combination of both. Thus, the methods and apparatuses for providing media via a communications device, or certain aspects or portions thereof, can take the form of program code (i.e., instructions) embodied in tangible storage media, such as floppy diskettes, CD-ROMs, hard drives, or any other machine-readable storage medium, wherein, when the program code is loaded into and executed by a machine, such as a computer, the machine becomes an apparatus for providing and/or receiving media via a communications device. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for providing media via a communications device also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of on-demand spam reporting. When implemented on a general-purpose processor, the program code combines with the processor to provide a unique apparatus that operates to invoke the functionality of providing media via a communications device. Additionally, any storage techniques used in connection with the utilization of providing media via a communications device can invariably be a combination of hardware and software.

While providing media via a communications device has been described in connection with the various embodiments of the various figures, it is to be understood that other similar embodiments can be used or modifications and additions can be made to the described embodiment for performing the same functions of providing media via a communications device without deviating therefrom. For example, one skilled in the art will recognize that providing media via a communications device as described in the present application may apply to any environment, whether wired or wireless, and may be applied to any number of such devices connected via a communications network and interacting across the network. Therefore, providing media via a communications device should not be limited to any single embodiment, but rather should be construed in breadth and scope in accordance with the appended claims.

What is claimed:

1. A device comprising:
  memory comprising executable instructions stored thereon; and
  a processor configured to execute the executable instructions to perform operations comprising:
  determining content of a message; and
  providing the message, wherein:
  when it is determined that content of the message comprises text only, providing the message via a short message service (SMS); and
  when it is determined that the content comprises media other than text, providing the message via a multimedia message service (MMS).

2. The device of claim 1, the operations further comprising:
  determining whether an email address is available or has been entered or selected to provide the message; and
  when it is determined that an email address is available or has been entered or selected, providing the message via email.

3. The device of claim 1, the operations further comprising:
  determining whether a phone number is available or has been entered or selected to provide the message; and
  when it is determined that a phone number is available or has been entered or selected, providing the message via the phone number.

4. The device of claim 1, the operations further comprising:
  determining whether multiple delivery options for providing the message are available;
  when it is determined that multiple delivery options are available; determining whether a subscriber associated with the communications device has a preferred delivery option; and
  when it is determined that the subscriber has a preferred delivery option, providing the message via the preferred delivery option.

5. The device of claim 4, the operations further comprising:
  when it is determined that the subscriber does not have a preferred delivery option, providing the message via a delivery option of the multiple delivery options having a lowest cost associated therewith.

6. The device of claim 1, the operations further comprising:
  determining whether multiple delivery options for providing the message are available;
  when it is determined that multiple delivery options are available, determining whether an intended recipient of the message has a presence indication for a delivery option; and
  when it is determined that the intended recipient has a presence indication for a delivery option, providing the message via the delivery option having the presence indication.

7. The device of claim 6, the operation further comprising:
  when it is determined that the intended recipient does not have a presence indication for a delivery option, providing the message via a delivery option of the multiple delivery options having a lowest cost associated therewith.

8. A device comprising:
  memory comprising executable instructions stored thereon; and
  a processor configured to execute the executable instructions to perform operations comprising:
  determining content of a message; and
  determining whether multiple delivery methods for providing the message are available;
  when it is determined that multiple delivery methods are available, determining whether an intended recipient of the message has a presence indication for a particular delivery method;
  when it is determined that the intended recipient has a presence indication for the particular delivery method, selecting the particular delivery method;
  when it is determined that the intended recipient does not have a presence indication for a particular delivery method, selecting a delivery method of the multiple delivery methods having a lowest cost associated therewith; and
  providing the message via the selected delivery method.

9. The device of claim 8, the operations further comprising:
  selecting a delivery method having a lowest cost among available delivery methods.

10. The device of claim 8, wherein a delivery method comprises a message delivered via at least one of a short message service (SMS) or a multimedia message service (MMS).

11. A computer-readable storage medium that is not a transient signal, the computer-readable storage medium having stored thereon executable instructions, that when executed by a processor perform operation comprising:

determining content of a message; and providing the message, wherein:

when it is determined that content of the message comprises text only, providing the message via a short message service (SMS);

when it is determined that the content comprises media other than text, providing the message via a multimedia message service (MMS).

12. The computer-readable storage medium of claim 11, the operations further comprising:

determining whether an email address is available or has been entered or selected to provide the message; and when it is determined that an email address is available or has been entered or selected, providing the message via email.

13. The computer-readable storage medium of claim 11, the operations further comprising:

determining whether a phone number is available or has been entered or selected to provide the message; and when it is determined that a phone number is available or has been entered or selected, providing the message via the phone number.

14. The computer-readable storage medium of claim 11, the operations further comprising:

determining whether multiple delivery options for providing the message are available;

when it is determined that multiple delivery options are available, determining whether a subscriber associated with the communications device has a preferred delivery option; and when it is determined that the subscriber has a preferred delivery option, providing the message via the preferred delivery option.

15. The computer-readable storage medium of claim 14, the operations further comprising:

when it is determined that the subscriber does not have a preferred delivery option, providing the message via a delivery option of the multiple delivery options having a lowest cost associated therewith.

16. The computer-readable storage medium of claim 11, the operations further comprising:

determining whether multiple delivery options for providing the message are available;

when it is determined that multiple delivery options are available, determining whether an intended recipient of the message has a presence indication for a delivery option; and when it is determined that the intended recipient has a presence indication for a delivery option, providing the message via the delivery option having the presence indication.

17. The computer-readable storage medium of claim 16, the operations further comprising:

when it is determined that the intended recipient does not have a presence indication for a delivery option, providing the message via a delivery option of the multiple delivery options having a lowest cost associated therewith.

\* \* \* \* \*